United States Patent [19]

Kadota et al.

[11] Patent Number: 5,176,769
[45] Date of Patent: Jan. 5, 1993

[54] RADIAL TIRE FOR AIRCRAFT INCLUDING BOTH A CIRCUMFERENTIAL BREAKER PLY AND AN INTERSECTING BREAKER PLY

[75] Inventors: Kuninobu Kadota, Kodaira; Shigeki Yamada, Tokyo, both of Japan

[73] Assignee: Bridgestone Corporation, Tokyo, Japan

[21] Appl. No.: 421,871

[22] Filed: Oct. 16, 1989

[30] Foreign Application Priority Data

| Oct. 14, 1988 | [JP] | Japan | 63-258876 |
| Dec. 22, 1988 | [JP] | Japan | 63-324370 |
| Dec. 23, 1988 | [JP] | Japan | 63-325622 |

[51] Int. Cl.⁵ .................. B60C 9/18; B60C 9/20; B60C 9/26; B60C 13/02
[52] U.S. Cl. .................. 152/523; 152/526; 152/528; 152/531
[58] Field of Search .............. 152/526, 528–529, 152/523, 531–536, 538

[56] References Cited

U.S. PATENT DOCUMENTS

| Re. 30,615 | 5/1981 | Mirtain | 152/538 |
| 3,253,635 | 5/1966 | Travers | 152/523 |
| 3,473,594 | 10/1969 | Mirtain | 152/538 |
| 3,842,884 | 10/1974 | Bertrand | 152/531 |
| 4,152,186 | 5/1979 | Shibata | 152/523 |
| 4,183,389 | 1/1980 | Grosch | 152/528 |
| 4,402,356 | 9/1983 | Musy | 152/531 X |
| 4,688,615 | 8/1987 | Lee . | |
| 4,745,957 | 5/1988 | Sumner | 152/531 |
| 4,949,770 | 8/1990 | Polvara et al. | 152/536 |
| 4,966,214 | 10/1990 | Kadota | 152/528 |

FOREIGN PATENT DOCUMENTS

| 0092498 | 10/1983 | European Pat. Off. . |
| 8806981 | 9/1988 | European Pat. Off. . |
| 1480933 | 4/1969 | Fed. Rep. of Germany . |
| 57-201704 | 12/1982 | Japan . |
| 58-188703 | 11/1983 | Japan . |
| 61-57406 | 3/1986 | Japan . |
| 61-241203 | 10/1986 | Japan . |
| 63-121102 | 5/1988 | Japan . |
| 1586721 | 3/1981 | United Kingdom . |
| 2216076 | 10/1989 | United Kingdom . |

*Primary Examiner*—Caleb Weston
*Assistant Examiner*—Adrienne C. Johnstone
*Attorney, Agent, or Firm*—Sughrue, Mion, Zinn, Macpeak & Seas

[57] ABSTRACT

A radial tire for an aircraft includes a toroidal carcass layer consisting of carcass plies having cords embedded therein intersecting at angles of 70°–90° with respect to an equatorial plane of the tire, a tread rubber arranged radially outwardly of the carcass layers, and a belt layer arranged between the carcass layers and the tread rubber and constructed by laminating circumferential breaker plies and intersecting breaker plies. The circumferential breaker plies have cords embedded therein substantially in parallel with the equatorial plane. The intersecting breaker plies have cords embedded therein intersecting at angles of 10°–70° with respect to the equatorial plane. Both radially outermost and innermost breaker plies of the belt layers are constructed by intersecting breaker plies.

5 Claims, 10 Drawing Sheets

COMPARATIVE EXAMPLE

COMPARATIVE EXAMPLE

COMPARATIVE EXAMPLE

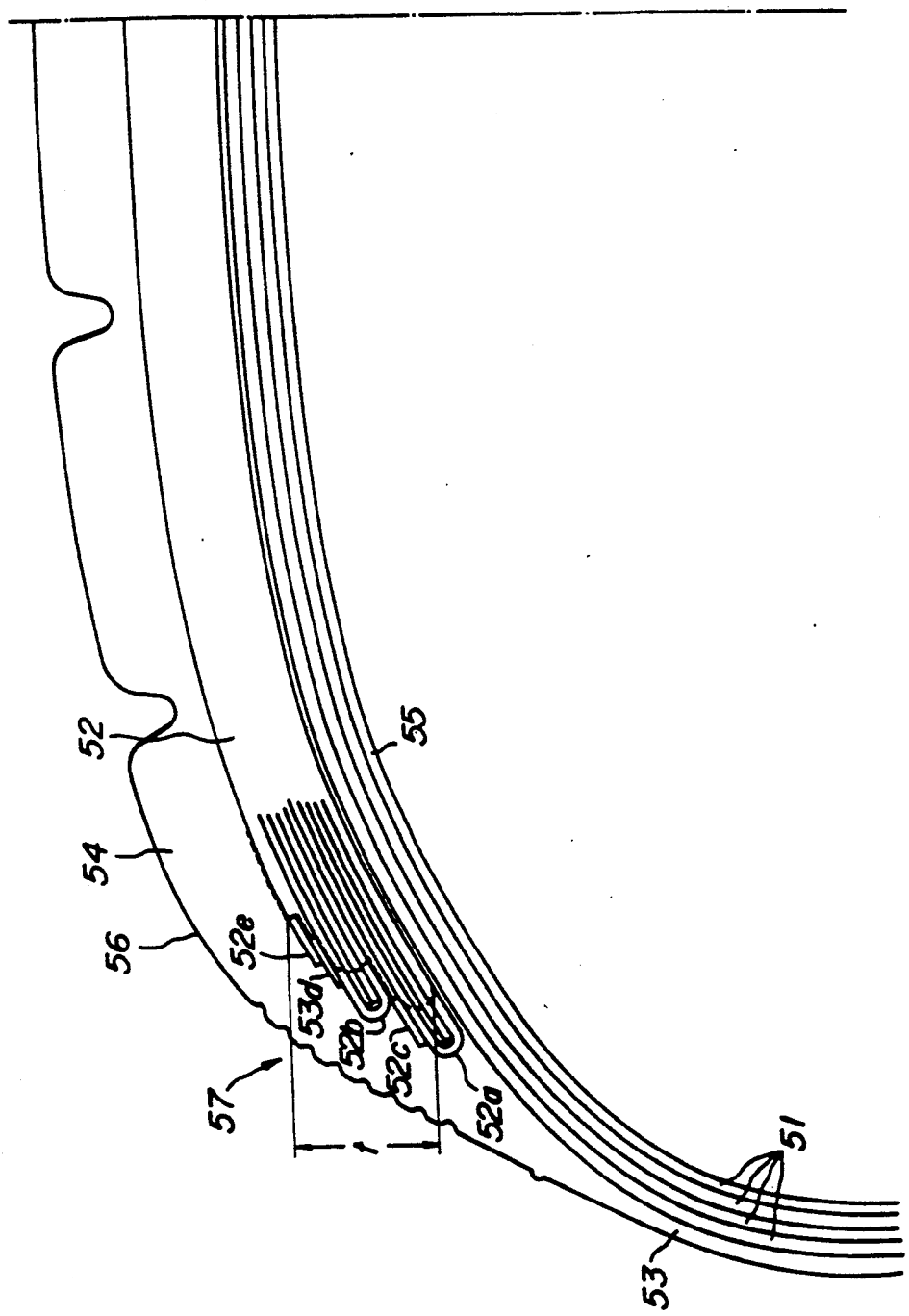

RADIAL TIRE FOR AIRCRAFT INCLUDING BOTH A CIRCUMFERENTIAL BREAKER PLY AND AN INTERSECTING BREAKER PLY

BACKGROUND OF THE INVENTION

This invention relates to a radial tire for aircraft.

A radial tire for aircraft has been known as disclosed in Japanese patent application laid-open No. 57-201,704. The tire includes a toroidal carcass layer consisting of at least one carcass ply having cords embedded therein extending perpendicular to an equatorial plane of the tire, a tread rubber arranged radially outwardly of the carcass layer, and a breaker arranged between the carcass layer and the tread rubber and formed by laminating at least one layer of circumferential plies and at least one layer of a breaker ply. Each of the circumferential plies has cords embedded therein substantially parallel to the equatorial plane. On the other hand, the breaker ply has cords embedded therein and intersecting at angles of 10°-70° with respect to the equatorial plane.

In general, a radial tire for aircraft is often damaged to a depth arriving at breaker layers by stones, metal pieces and the like when rolling. If the circumferential plies as above described are arranged on an outermost layer of the breaker layer, the cords embedded in the circumferential ply will be broken.

In this case, extending directions of the circumferential plies are substantially same as rotating directions of the tire. Therefore, when the cords are broken as above described, the cords and tread rubber are readily peeled from the broken positions and such peeling will rapidly develop in circumferential directions until the cords and the tread rubber are dislodged from the tire and fly in all directions, which is so-called "peel-off". Once such a peel-off occurs, fragments of the cords and the tread rubber impinge against a body of the aircraft at high speeds to damage it. Therefore, safety for the aircraft could not be ensured, while expensive and time-consuming repairing of the aircraft is required.

In order to avoid this, the tire disclosed in the above Japanese application includes a breaker ply arranged radially outwardly of the circumferential plies to prevent the peeling of the cords of the circumferential plies and the tread rubber developing in the circumferential directions when damaged. With the tire disclosed in the Japanese application, moreover, the cords of the breaker ply are oblique to the tire equatorial plane so that when the tire is injured and one oblique cord is cut, the cut growing in a circumferential direction will encounter adjacent oblique cords which would obstruct the growth of the cut. Therefore, peel-off can be prevented by such cords oblique to the equatorial plane of this tire.

With such a radial tire for an aircraft, however, as shoulders of the tire are dragged on a road when rolling, only the shoulders are rapidly worn off to cause irregular wear. The reason will be explained hereinafter.

In general, a tire is subjected to bending deformation at contacting portions with a road when rolling as shown in FIG. 9. If a belt layer consists of only breaker ply of a plurality of layers, the tire will undergo the following stresses. The farther radially inwardly from a neutral plane in a center of the belt layer or the nearer to the carcass layer, the larger tensile stresses occur. On the other hand, the farther radially outwardly from the neutral plane or the nearer to the tread rubber, the larger compressive stresses occur.

With the hitherto used tire as above described, since the circumferential plies arranged radially inwardly of the breaker ply or near to the carcass layer are subjected to the large tensile stresses, elongation and contraction of the belt layer itself are considerably obstructed. The result is that difference in circumferential length between the tread center and shoulder owing to crown curvatures (curvatures of tread contours in meridian sections) cannot be taken up only by the elongation of the belt layer when contacting a road.

Therefore, the difference in the circumferential length is accumulated in the tread rubber of the shoulders from initial contacting to leaving the road to increase the shearing deformations in the circumferential directions. However, such shearing deformations are rapidly restored when the tread rubber leaves the road so that the tread rubber at the shoulders drags on the road.

Moreover, a radial tire for an aircraft has been known as disclosed in Japanese patent application laid-open No. 61-57,406. This tire includes a toroidal carcass layer consisting of at least one carcass ply having cords embedded therein intersecting at angles of 60°-90° with respect to an equatorial plane of the tire, a tread rubber arranged radially outwardly of the carcass layer, and a belt layer arranged between the carcass layer and the tread rubber and made of a lamination of at least one circumferential ply and at least one breaker ply. The circumferential ply has cords made of organic fibers such as nylon embedded therein and substantially in parallel with the equatorial plane. On the other hand, the breaker ply has cords made of organic fibers embedded therein and intersecting at angles less than 30° with respect to the equatorial plane.

At least one breaker ply has a width (before being folded) wider than those of the other breaker plies and circumferential plies, and width edges of the breaker ply extending laterally from the other belt and circumferential plies are folded radially outwardly or radially inwardly onto the same side. As an alternative, one width edge may be folded radially outwardly and the other width edge may be folded radially inwardly. As a result, the folded width edges of the breaker ply are on the center thereof extending from one folded width edge to the other folded width edge. In this case, the width of the breaker ply after being folded (ply width) is substantially equal to those of the other belt and circumferential plies.

With such a breaker ply, particularly a folded breaker ply, since the cords embedded therein are made of heat-shrinkable organic fibers, they will shrink several percent in longitudinal directions by vulcanizing heat in vulcanizing. When they shrink, the width of the breaker ply 33 (ply width) is reduced to the positions in phantom lines as shown in FIGS. 1 and 2 because of the cords 31 extending obliquely with respect to the equatorial plane 32 shown in the drawings.

In this case, if the width edges A and B of the breaker ply 33 and hence the cords 31 embedded therein have been folded as above described, the cords 31 at the folded ends 34 and 35 are displaced in width directions of the breaker ply 33 (axial directions of the tire) by a restraining action of the cords 31 (inclined in reverse directions of the cords at the width center of the ply) of the folded width edges A and B. An influence by such a restraining action is maximum at the folded ends 34 and 35 and becomes smaller when approaching the center of the ply.

As a result, as illustrated in FIG. 2 intersecting angles a of the cords 31 with respect to the equatorial plane 32 change as shown in broken lines and become smaller as approaching the folded ends 34 and 35. Therefore, distances L between the cords 31 in the proximity of the folded ends 34 and 35 become narrower than those M before vulcanizing. In this case, the cords 31 embedded in the width center C of the breaker ply 33 continuously extend from one folded end to the other folded end so that the influence of the shrinkage of the cords 31 in all the areas concentrates on the center of the breaker ply 33, with the result that the reduction in width (ply width) at the center C in vulcanizing is enhanced. Moreover, such a reduction in ply width is converted into a reduction in intersecting angles a in the proximity of the folded ends 34 and 35 so that the distance L between the cords 31 in the proximity of the folded ends 34 and 35 become much narrower.

When the tire is deformed in contacting a road, the rubber between the cords 31 is subjected to shearing forces. Such shearing forces become larger as approaching the folded ends 34 and 35 whose distances L between the cords are narrower. Therefore, the rubber between the cords 31 in the proximity of the folded ends 34 and 35 is subjected to great shearing strains so that separations at belt ends are likely to occur.

In pneumatic tires for aircraft, the application of radial carcasses has been strongly studied and developed. However, owing to excessive side forces particularly in such a use, rubber cracks similar to chevron-cuts often occur in buttresses of the tires.

In Japanese utility model application laid-open No. 63-121,102, it is proposed to provide hollow portions having several mm depth and widths wider than the depths in the buttresses in order to prevent separations of belt layers at shoulders to improve the durability of the radial tire for aircraft. However, this Japanese specification does not suggest avoiding the rubber cracks in buttresses. There has been no documents mentioning the relations between the rubber cracks in buttresses and strong side forces acting upon tires due to strong traverse wind when landing.

SUMMARY OF THE INVENTION

It is an object of the invention to provide a radial tire for aircraft, which can effectively prevent peel-off and irregular wear at shoulders of the tire.

It is another object of the invention to provide a radial tire for aircraft, which can effectively prevent separations at belt ends by restraining any reduction in distances between cords embedded in breaker plies.

It is a further object of the invention to provide a radial tire for aircraft, which can effectively prevent rubber cracks caused by excessive and shock loads due to unavoidable strong traverse wind under positional conditions of airports and limitations of installations.

In order to achieve these objects, in a radial tire for aircraft including a toroidal carcass layer consisting of at least one carcass ply having cords embedded therein intersecting at angles within a range of 70° to 90° with respect to an equatorial plane of the tire, a tread rubber arranged radially outwardly of the carcass layer, and a belt layer arranged between the carcass layer and the tread rubber and constructed by laminating at least one circumferential breaker ply and at least one intersecting breaker ply, said circumferential breaker ply having cords embedded therein substantially in parallel with said equatorial plane and said intersecting breaker ply having cords embedded therein intersecting at angles within a range of 10° to 70° with respect to the equatorial plane, according to the invention both radially outermost and innermost breaker plies of said belt layer are constituted by intersecting breaker plies.

In a preferred embodiment, the at least one circumferential breaker ply is arranged radially inwardly of a breaker ply positioned at the number of count from the innermost breaker ply corresponding to the number obtained by multiplying all the number of the breaker plies at a center of the belt by ⅔ and rounding off to the nearest positive integer. Moreover, both width edges of a radially innermost intersecting breaker ply ar preferably folded radially outwardly, and the circumferential breaker ply is arranged radially outwardly of folded width edges of the intersecting breaker ply.

When the tire is rolled under a loaded condition, the tire is subjected at contacting portions with a road to bending deformations similar to those above described. In this case, the radially outermost breaker ply of the belt layer is constructed by an intersecting breaker ply or at least one intersecting breaker ply layer is arranged radial outwardly of the circumferential breaker ply. Therefore, even if the tire is damaged arriving at cords of the circumferential breaker ply, any peeling of cords of the circumferential breaker ply developing in circumferential directions is prevented by the intersecting breaker ply arranged outwardly thereof to eliminate peel-off as above described.

Moreover, the breaker ply arranged radially innermost of the belt layer or the breaker ply arranged adjacent the carcass layer is also constructed by intersecting breaker ply so that at least one layer of intersecting breaker ply is arranged radially inwardly of the circumferential breaker ply which is difficult to extend in circumferential directions. Since the intersecting breaker ply can be readily elongated in the circumferential directions by changes in cord angles and elongations of rubber between the cords, the difference in circumferential length between tread center and shoulders is substantially taken up thereby. Therefore, shearing deformations accumulated in the tread rubber when contacting the road are reduced to prevent irregular wear at shoulders.

The reason why the circumferential breaker ply is arranged at the position as above described is as follows. External tire damage caused by stones, metal pieces and the like arrive at various depths. In the event that the external damage arrives at positions deeper than one fourth of the thickness of the belt layer measured from the outermost surface thereof, the tire is unavoidably discarded because even if the tire is recapped or recovered, the breaking pressure of the recapped tire is lower than a standardized pressure.

On the other hand, in the event that the external damage arrives at positions shallower than one fourth of the thickness of the belt layer, it can be reused as a recapped tire. In this case, however, if cords of the circumferential breaker ply are broken, separations will develop from the damaged portions in circumferential directions along the cords by deformations and centrifugal forces when landing or taking-off. Once such separations have occurred in the belt layers, the tire could not be used as recapped tire even if the breaking pressure is within the standardized value. According to the invention, therefore, the circumferential breaker ply is arranged at the positions above described to improve the possibility capable of being reused as a recapped or recovered tire.

Moreover, large shearing strains would occur at ply ends of the radially innermost intersecting breaker ply by deformations when contacting a road. Therefore, if ends of the cords embedded therein are exposed at the ply ends, there is a risk of separations at the cord ends due to stress concentrations. In order to prevent such a risk, according to the invention both the width edges of the intersecting breaker ply are folded outwardly so that the cord ends are brought near the tire equatorial plane.

Moreover, if separations occur at the ply ends due to stress concentrations, the intersecting breaker ply is peeled owing to the centrifugal forces when rolling and the peeling will develop in the circumferential directions. In order to prevent such a disadvantage, according to the invention the circumferential breaker ply is arranged radially outwardly of both width edges of the folded intersecting breaker ply so that both the ends of the intersecting breaker ply are externally hooped.

In order to achieve the object of the invention, in a preferred embodiment, both width edges of at least one intersecting breaker ply are folded on a width center portion of the intersecting breaker ply extending from one folded edge to the other folded edge. Also, at least one folded intersecting breaker ply is cut at its width center portion perpendicularly to a width direction of the breaker ply.

In the tire for aircraft according to the invention, the cords embedded in the intersecting breaker ply are constructed from organic fibers so that the cords shrink several percentages in longitudinal directions by vulcanizing heat in vulcanizing to reduce the width of the intersecting breaker ply. In the event that the intersecting breaker ply is a ply with its width edges being folded, intersecting angles of the cords in the proximity of the folded ends with respect to the equatorial plane become smaller owing to the reduction in ply width. On the other hand, large shearing forces act on the ply ends due to the deformations when contacting a road so that great shearing strains will occur in the rubber between cords of ply ends (folded ends) in conjunction with the reduction in cord intersecting angle above described.

Therefore, according to the invention at least one intersecting breaker ply layer among the folded intersecting breaker plies is severed at its width center portion so that the length of the cords embedded in the center portion of the breaker ply is made shorter than that in the prior art. For example, in the case of only one severed portion, the length of the cords is a length corresponding to a length from the one folded end to the severed portion or from the severed portion to the other folded end, and cord ends at the severed portion are free ends without being restrained. As a result, when the cords shrink by vulcanizing heat in vulcanizing, only the ends of the cords in the proximity of the severed portion are displaced, slidingly passing through the rubber.

It is considered that total amounts of shrinkage of the cord embedded in the center of the intersecting breaker ply are substantially constant. Therefore, the displacement of the cords positioned at the folded ends is reduced by the displacement of the cord ends at the severed portion. As a result, the reduction in distance between the cords in the proximity of the folded ends is restrained so that the shearing strains in the rubber between the cords in the proximity of the folded ends are reduced, with result that separations at the belt ends are prevented.

Moreover, by providing the circumferential breaker ply in the belt layer, the tire according to the invention sufficiently endures high loads and high speeds when landing or taking-off.

Moreover, in order to achieve the object of the invention, in a further embodiment, the tread rubber is formed with a plurality of shallow grooves having depths of 0.5-1.5 mm and spaced by distances of 3-10 mm from each other within ranges wider than a thickness of edges of the belt measured in a radial direction of the tire in buttress areas outwardly of contacting tread edges where round shoulder tread rubbers contact a road when filled with a normal inner pressure under a normal load.

The shallow grooves preferably have groove edges chamfered to be round. With at least shallow grooves near to the contacting tread edges, curvatures of the edges of the shallow grooves on a side of sidewalls are preferably larger than those of the edges on a side of the contacting tread edges.

In order that the invention may be more clearly understood, preferred embodiments will be described, by way of example, with reference to the accompanying drawings.

BRIEF DESCRIPTION OF THE DRAWINGS

FIG. 14 is a sectional view of a tire of a fifth embodiment of the invention;

EXPLANATION OF THE PREFERRED EMBODIMENTS

Figure 1:
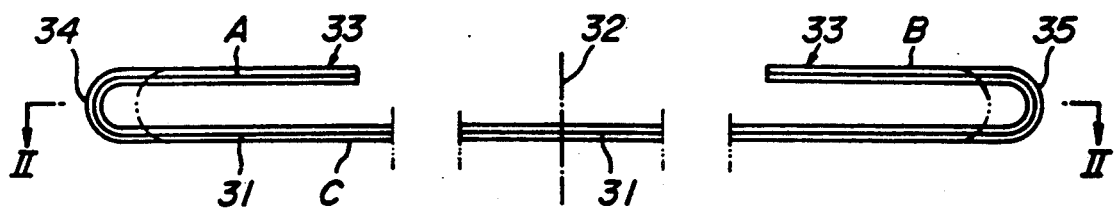
FIG. 1 is a sectional view of a belt layer of an aircraft radial tire of the prior art taken along a meridian plane.
Figure 2:
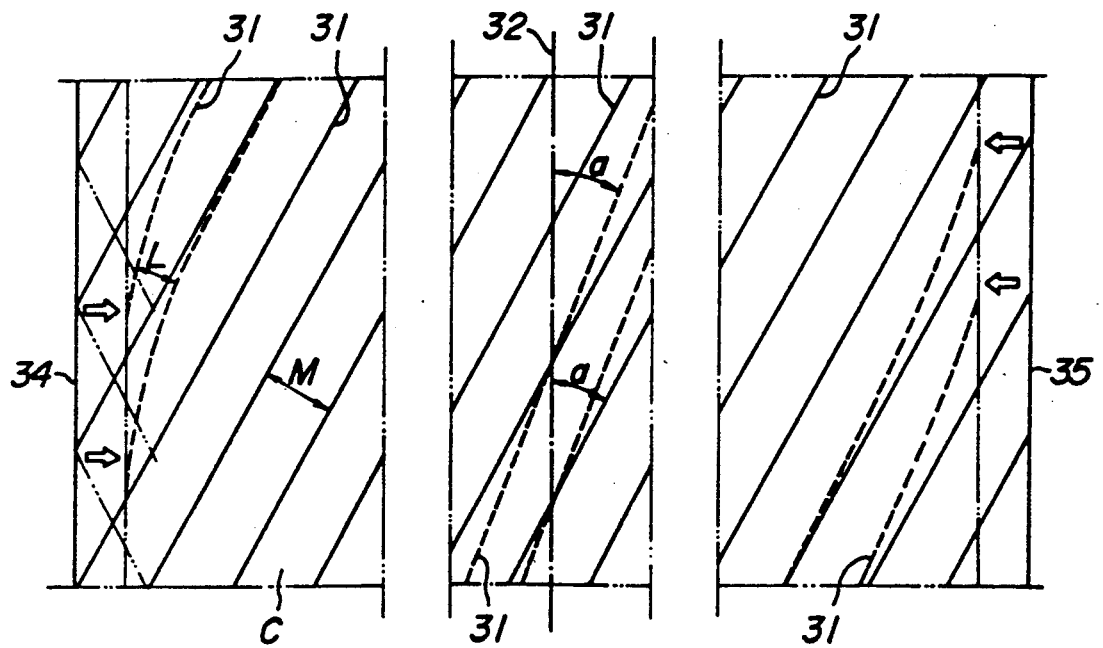
FIG. 2 is a sectional view of the belt layer taken along the line II—II in FIG. 1.
Figure 3:
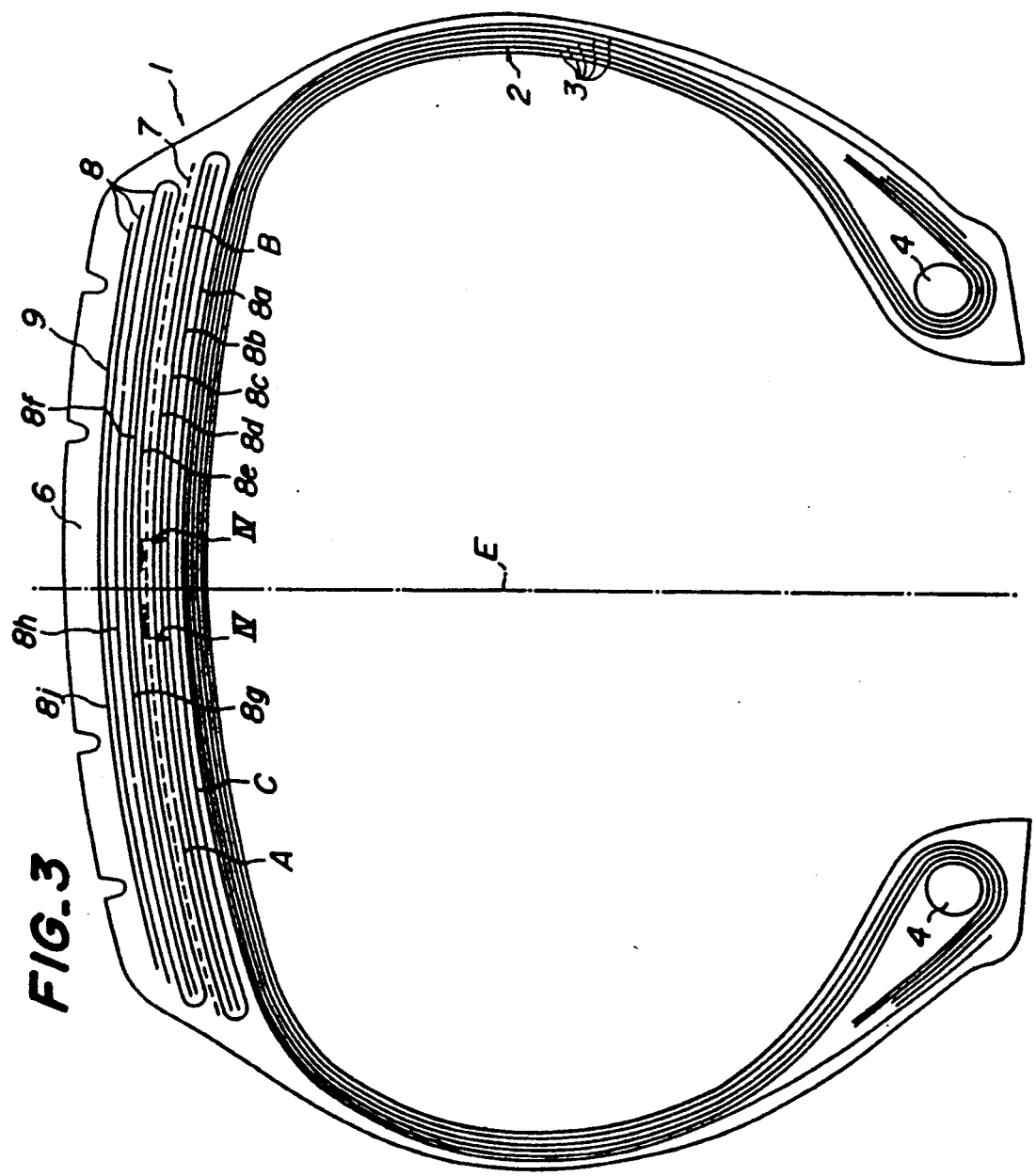
FIG. 3 is a sectional view of a tire according to the invention taken along its meridian plane.

Referring to FIG. 3 illustrating one embodiment of a radial tire for an aircraft according to the invention, the tire 1 includes a carcass layer 2 having a toroidal shape in a meridian section which is a radial section including a rotating axis of the tire. The carcass layer 2 consists of two or more layers, five layers 3 in this embodiment. The four layers on an inner side have edges viewed in width directions, which are turned-up around a pair of beads 4 from the inside to the outside to form turn-up plies. The outermost carcass ply 3 as a down ply extend along the outside of the turn-up portions of the carcass plies to the proximities of the beads 4.

Figure 4:
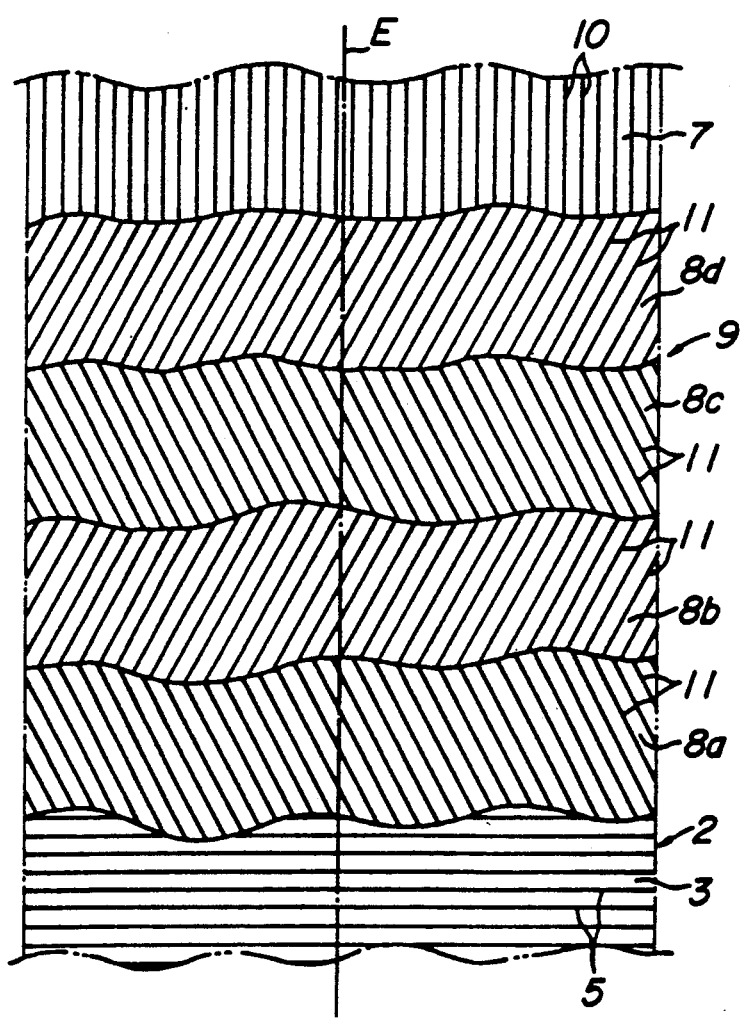
FIG. 4 is a sectional view of the tire taken along the line IV—IV in FIG. 3.

These carcass plies 3 include cords 5 (FIG. 4) embedded therein which intersect with each other with respect to an equatorial plane E at angles within a range of 70° to 90°, 90° in this embodiment. The cords 5 are made of organic fibers, nylon 66 (1890 d/3) in this embodiment. A tread rubber 6 is arranged radially outward of the carcass layer 2. Between the tread rubber 6 and the carcass layer 2 is arranged a belt layer 9 made of a lamination of a circumferential breaker ply 7 and intersecting breaker plies 8.

The circumferential breaker ply 7 may be made of at least one layer, only one layer in this embodiment. The circumferential breaker ply 7 has a spirally wound cord or a number of cords embedded therein which are made of organic fibers, nylon 66 (1890 d/4) in this embodiment, in parallel with an equatorial plane E of the tire. In this case, it is preferable to arrange only one circumferential breaker ply 7 as described above. If a breaker ply 7 of more than two layers is arranged, the belt layer 9 will become difficult to extend and contract in circumferential directions so that difference in circumferential length between shoulders and center of the tread is not taken up sufficiently by extension and contraction of the belt layer 9 when the tire rolling is loaded. As a result, the shoulders are dragged on a road to cause irregular wear thereat.

On the other hand, the intersecting breaker ply 8 has more than two layers, ten layers in this embodiment. Each of the breaker plies 8 includes cords 11 embedded therein which intersect at angles within a range of 10° to 70° with respect to the equatorial plane E, at an angle of approximately 20° in this embodiment. The cords 11 (FIG. 4) of the adjacent breaker plies 8 are arranged to intersect with each other. These cords 11 are made of organic fibers, nylon 66 (1890 d/3) in this embodiment.

The radially outermost and innermost breaker plies of the belt layer 9 are constructed by intersecting breaker plies 8a and 8j. As a result, the circumferential breaker ply 7 is arranged between the outermost and innermost breaker plies. The circumferential breaker ply 7 is preferably arranged radially inwardly of the intersecting breaker ply positioned at the number by count from the innermost breaker ply 8a corresponding to the number obtained by multiplying all the number of the layers at the center of the belt 9 by $\frac{3}{4}$ and rounded off to the nearest positive integer. In this embodiment, the breaker ply 7 is preferably positioned radially inwardly of the intersecting breaker ply 8g (although 11 multiplied $\frac{3}{4}$ is 8.25, 8 is used because it must be a positive integral number). The breaker ply 7 is arranged at fifth from the radially innermost layer in this embodiment.

The reason for such a arrangement of the breaker ply 7 is as follows. If depths of external cuts by stones and metal pieces are shallower than positions $\frac{1}{4}$ of a thickness from the radially outermost of the belt layer 9 of a tire, it can be reused as a recovery or recapped tire by replacing with a new tread because a breaking pressure is less than the determined pressure. On the other hand, if a circumferential breaker ply 7 is arranged shallower than the position above described and cords of the breaker ply 7 are cut by stones and metal pieces, separations in rubber and between the rubber and the cords 10 will develop circumferentially from the cut by deformation and centrifugal forces when landing so that it could not be used as a recapped tire. Therefore, the circumferential breaker ply 7 is arranged radially inwardly of the 8th layer to improve the probability of being used as a recapped tire.

Both width edges of the radially innermost intersecting breaker ply are preferably radially outwardly folded on the other breaker plies. In this embodiment, the innermost and sixth intersecting breaker plies 8a and 8e are made longer than the other breaker plies, and both the width edges A and B of them are folded outwardly to surround the width edges of the second and third intersecting breaker plies 8b and 8c and the width edges of the seventh and eighth intersecting breaker plies 8f and 8g.

The reason for such an arrangement of the folded breaker plies is as follows. Great shearing strains will occur at ply ends of the radially innermost intersecting breaker ply 8a by its deformation thereat when contacting with a road. If both ends of the cords 11 embedded in the intersecting breaker ply 8a are exposed at the ply ends to atmosphere, there is a risk of separations caused by stress concentration. By folding the width edges of the breaker plies the ends of the cords approach the equatorial plane E of the tire so that the separations can be prevented.

Moreover, the fourth and ninth intersecting breaker plies 8d and 8h are arranged between the width edges A and B of the intersecting breaker ply 8a and between the width edges A and B of the intersecting breaker ply 8e, respectively.

The circumferential breaker ply 7 is preferably arranged radially outward of the folded width edges A and B of the innermost intersecting breaker ply 8a. In this embodiment, the breaker ply 7 is arranged on the width edges A and B of the fourth layer or positioned as a fifth layer as above described. The reason for such an arrangement of the circumferential breaker ply 7 is as follows. With such an arrangement, the intersecting breaker ply 8a is clamped outwardly as a hoop by the circumferential breaker ply 7 to prevent the phenomenon that separations occurring at ply ends by stress concentrations would otherwise develop in circumferential directions by peeling of the intersecting breaker ply 8a caused by centrifugal forces during high speed running.

The function of the embodiment of the invention will be explained hereinafter.

When the tire 1 is rolled on a road under a loaded condition, the tire is subjected to a bending deformation at the contacting portion with the road in the same manner as above described. In this case, since the breaker ply arranged at the radially outermost of the belt layer 9 is constructed by the intersecting breaker ply 8j or at least one layer (six layers) of the intersecting breaker plies 8 is arranged radially outward of the circumferential breaker ply 7, even if the tire is externally damaged to a depth arriving at the cords 10 of the circumferential breaker ply 7, any peeling of the breaker ply 7 developing in circumferential directions of the cords 10 is obstructed by the intersecting breaker plies 8 of the six layers arranged on the outside of thereof, thereby preventing the occurrence of the peel-off.

Moreover, since even the radially innermost breaker ply of the belt layer 9 arranged adjacent the carcass layer 2 is constructed by the intersecting breaker ply 8a, at least one layer (four layers in this embodiment) of the intersecting breaker ply 8 is arranged radially inwardly of the circumferential breaker ply 7 which is difficult to be elongated in circumferential directions. However, as the intersecting breaker plies 8 can readily elongate in the circumferential directions with the aid of elongation of rubber between the cords 11 and angular displacements of the cords 11 when contacting the road, the difference in circumferential length between the tread center and the shoulders is substantially taken up by the elongations in the circumferential directions. Therefore, shearing deformations accumulated in the tread rubber 6 at the shoulders when contacting the road become less so that occurrence of the irregular wear at the shoulders is prevented.

The result of testing for the tires according to this embodiment and tires of the prior art will be explained hereinafter.

Figure 5:
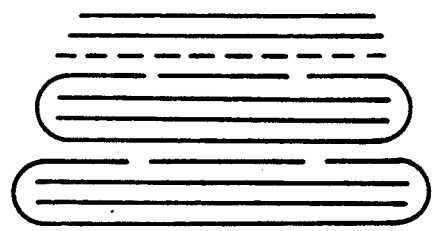
FIG. 5 is a sectional view of belt layers of a tire according to the invention used in a test taken along a meridian plane.
Figure 6:
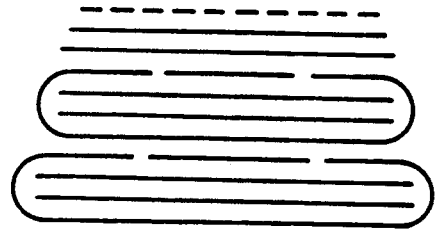
FIG. 6 is a sectional view of belt layers of a tire of Comparative Example 1 taken along a meridian plane.
Figure 7:
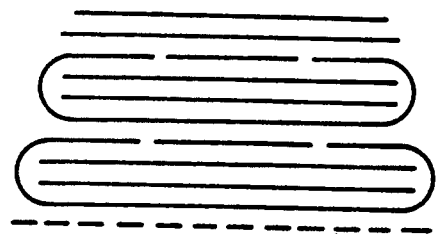
FIG. 7 is a sectional view of belt layers of a tire of Comparative Example 2 taken along a meridian plane.
Figure 8:
FIG. 8 is a sectional view of belt layers of a tire of Comparative Example 3 taken along a meridian plane.
Figure 9:
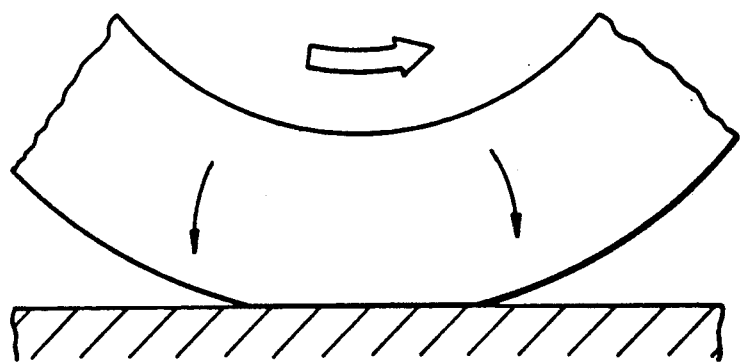
FIG. 9 is an explanatory view for bending deformations of a tire when contacting a road.

Various tires were prepared for the test. Tires of Example 1 were those of the embodiment above explained. Tires of Example 2 were those similar to those of the Example 1 with exception of a circumferential breaker ply being arranged between eighth and tenth intersecting breaker plies or being ninth layer as shown in FIG. 5. Tires of Comparative Example 1 had a circumferential breaker ply similar to that of the Example 1 but arranged radially outermost as shown in FIG. 6. Tires of Comparative Example 2 had a circumferential breaker ply similar to that of the Example 1 but arranged radially innermost as shown in FIG. 7. Tires of Comparative Example 3 included intersecting breaker plies of eleven layers laminated and being not folded as shown in FIG. 8. The tire size was H46×18.0R 20.

Each of these tires was filled with an inner pressure of 14.1 kg/cm$^2$. The tire was then urged under a load of 44,200 Lbs (20,049 kg) against a drum. The drum was rotatively driven to drive the tire to increase the rotating speeds of the tire from 0 mile/hr to 225 mile/h (362.1 km/hr). The occurrence of standing waves was observed.

The standing waves occurred with the tires of Comparative Example 3 at the speed of 210 mile/hr (338 km/hr), but any standing waves did not occur with other tires even at the maximum speeds. It was proved that the arrangement of the invention did not detrimentally affect the standing wave performance.

A cut having a 4 cm length and extending in the rotating axis directions of the tire (width directions of the breaker ply) was formed in the width center of the breaker ply located radially outermost of the tire with a knife. The tire was filled with inner pressure of 14.1 kg/cm$^2$. The tire was then urged under a load of 44,200 Lbs (20,049 kg) against the drum. The tire was rotatively driven under the condition to increase the speeds of the tire from 0 mile/h to 225 mile/hr (362.1 km/h) and the load was then removed. Such a take-off simulation was repeated until the tire was broken or maximum of 50 times.

The results of such an injured durability test were as follows. Tires of Examples 1 and 2 and Comparative Example 2 could be subjected to all the simulations. However, with the tires of Comparative Example 1, parts of tread rubber and belt layers were peeled and flew in all directions at the second taking off simulation and therefore the test was stopped. Moreover, with the tires of Comparative Example 3, expansions occurred at belt ends at forty times of the simulation so that the test was stopped.

After the test was completed, the tires were cut and opened to observe separations at the belt ends. As a result, no separations occurred with the tires of Examples 1 and 2. However, with the tires of Comparative Example 2, separations occurred partially on circumferences at folded ends. It was found that the expansions above described were separations at a belt ends.

Moreover, cuts similar to those above described were formed in the tires through breaker plies of first, second and third layers from the radially outermost (corresponding to ¼ of the number of all the breaker plies). Thereafter, take-off simulations were effected on the tires. Results were as follows.

The tires of Example 1 and Comparative Example 2 could be subjected to all the simulations. However, with the tires of Example 2, expansions occurred at injured portions at eighth simulations so that the test was stopped. In the tires of Comparative Example 1, parts of belt layers were peeled and flew in all directions at the first take-off simulation and therefore the test was stopped. The injured durability test was not carried out on the tires of Comparative Example 3.

After the test was completed, the tires were cut and opened to observe separations at the belt ends. No separations occurred at the belt ends with the tires of Example 1. However, with the tires of Comparative Example 2, separations occurred at corresponding positions as in the previous test.

Moreover, the tires were urged against the drum which rotates the tires to effect a promoting wear test wherein average wear amounts in tire surfaces were measured at tread centers and shoulders. Irregular wear characteristics indicated by indexes were 106 and 103 with the tires of Examples 1 and 2 and 102, 135 and 103 with the tires of Comparative Examples 1, 2 and 3. In this case, the index 100 corresponded to the average wear amount at the tread center of each of the tires. A value nearer to 100 means that the wear was more uniform.

As can be seen from the above, with the tires of Comparative Examples 1 and 2, since the circumferential breaker plies are arranged radially outermost or radially innermost, the damage durability and irregular wear characteristics are lowered. In contrast herewith, with the tires of Example 1, the damage durability and irregular wear characteristics are improved without lowering the standing wave performances. With the tires of Example 2, both the damage durability and the irregular wear characteristics are improved, but the damage durability is somewhat lowered in comparison with those of Example 1 because the circumferential breaker ply is injured and the tires are rolled under loaded conditions.

As can be seen from the above explanation, according to the invention the peel-off in radial tires for aircrafts is prevented, while the irregular wear at shoulders is also effectively prevented.

Figure 10:
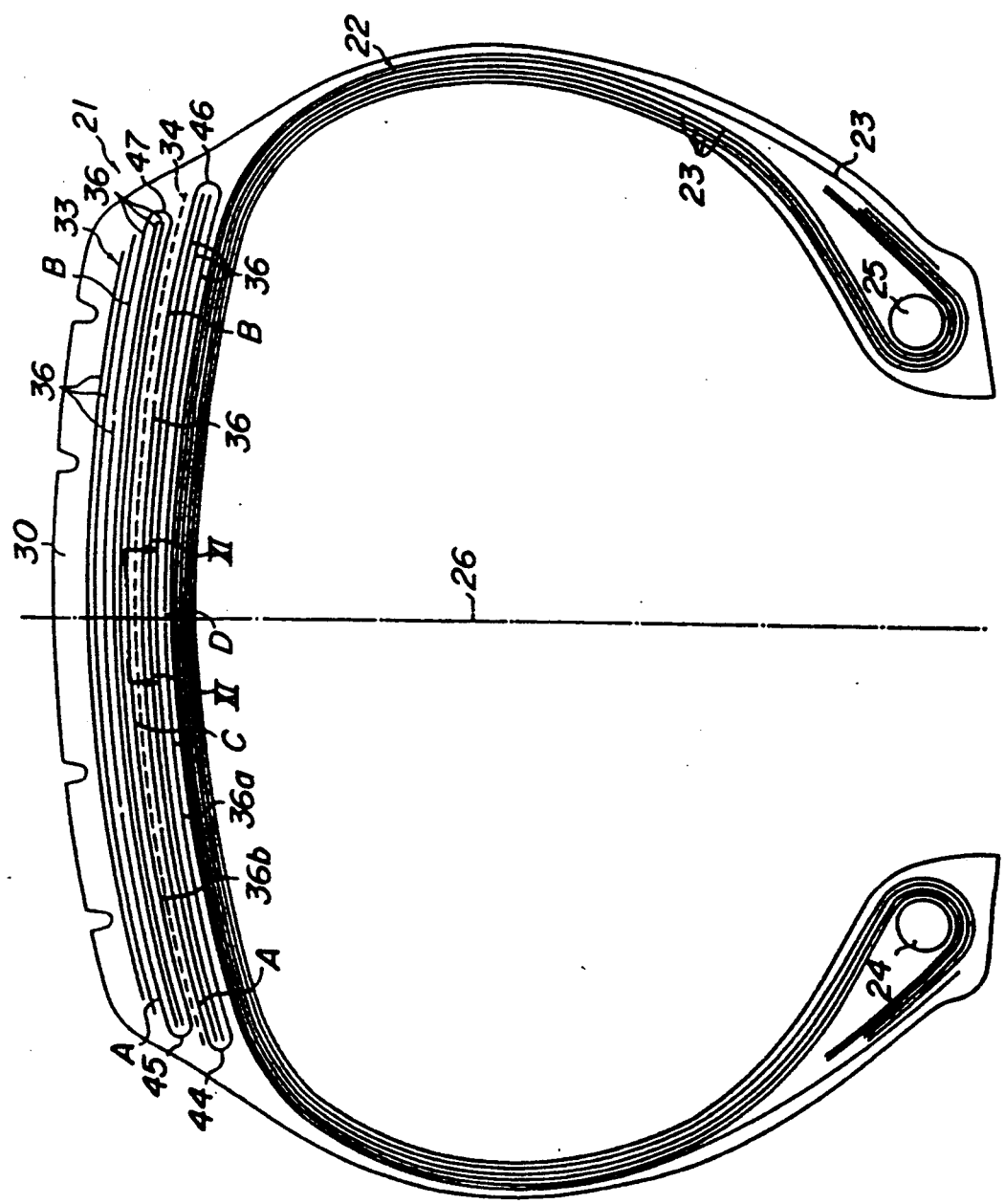
FIG. 10 is a sectional view of a tire according to a second embodiment of the invention taken along a meridian plane.
Figure 11:
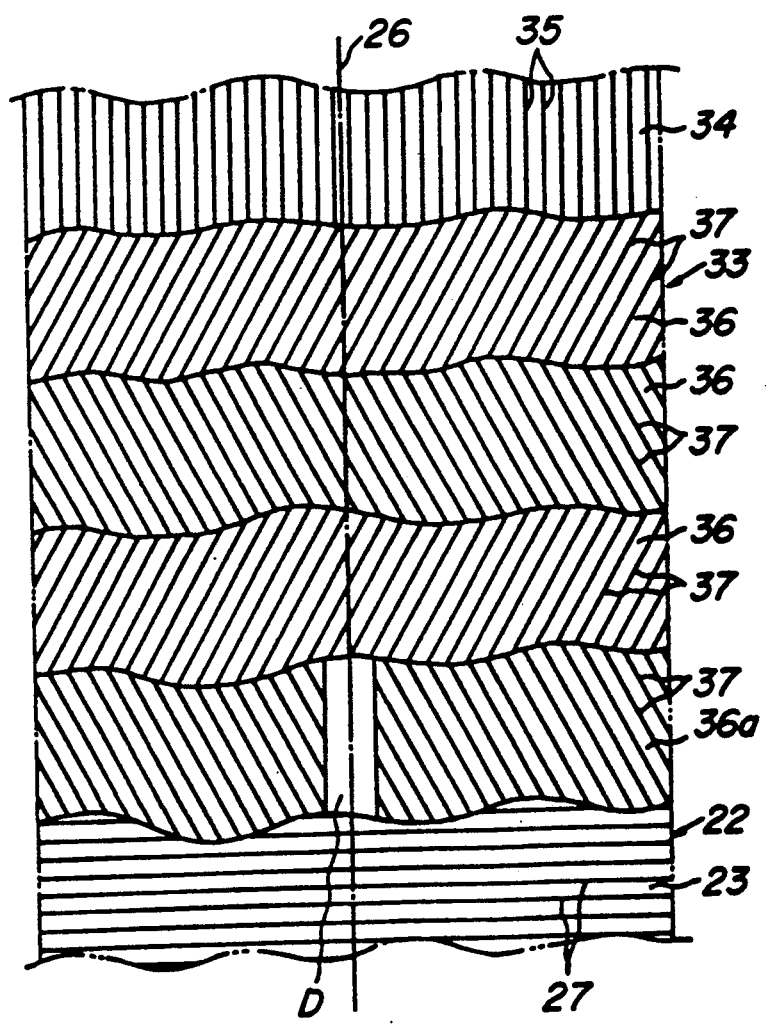
FIG. 11 is a sectional view taken along the line XI—XI in FIG. 10.

Referring to FIGS. 10 and 11 illustrating a second embodiment of the radial tire for an aircraft according to the invention, the tire 21 includes a carcass layer 22 having a toroidal shape in a meridian section which is a radial section including a rotating axis of the tire. The carcass layer 22 consists of two or more layers, five layers 23 in this embodiment. The four layers on an inner side have edges viewed in width directions, which are turned-up around a pair of beads 24 and 25 from the inside to the outside to form turn-up plies. The outermost carcass ply 23 extends along the outside of the turn-up portions of the carcass plies to the proximities of the beads 24.

These carcass plies 23 include cords 27 embedded therein which intersect with each other with respect to an equatorial plane 26 at angles within a range of 70° to 90°, 90° in this embodiment. The cords 27 are made of organic fibers, nylon 66 (1890 d/3) in this embodiment. A tread rubber 30 is arranged radially outward of the carcass layer 22. Between the tread rubber 30 and the carcass layer 22 is arranged a belt layer 33 made of a lamination of a circumferential breaker ply 34 and intersecting breaker plies 36.

The circumferential breaker ply 34 may be made of at least one layer only one layer in this embodiment. The circumferential breaker ply 34 has a spirally wound cord 35 or a number of cords embedded therein which are made of organic fibers, nylon 66 (1890 d/4) in this embodiment, in parallel with an equatorial plane 26 of the tire. In this case, it is preferable to arrange only one circumferential belt 34 as described above. If a breaker ply 34 of more than two layers is arranged, the belt layer 33 will become difficult to extend and contract in circumferential directions so that difference in circumferential length between shoulders and center of the tread is not taken up sufficiently by extension and contraction of the belt layer 33 when the tire rolling being loaded. As a result, the shoulders are dragged on a road to cause irregular wear thereat.

On the other hand, the intersecting breaker ply 36 has more than two layers, ten layers in this embodiment. Each of the breaker plies 36 includes cords 37 embedded therein at a rate of 32/(5 cm) which intersect at angles within a range of 10° to 70° with respect to the equatorial plane 26, at an angle of approximately 20° in this embodiment. The cords 37 of the adjacent breaker plies 36 are arranged to intersect with each other. These cords 37 are made of organic fibers, nylon 66 (1890 d/3) in this embodiment.

These cords 37, 35 and 27 may be made of rayon, polyester, vinylon, polyvinyl alcohol fibers or the like other than nylon. In case that these heat-shrinkable organic fibers are used, the cords 27, 35 and 37 will contract several percentages in longitudinal directions (about 8% with nylon) when vulcanizing.

Among the intersecting breaker plies 36, at least one intersecting breaker ply 36 is made wider than the other breaker plies. In this embodiment, the innermost intersecting breaker ply 36a and the sixth intersecting breaker ply 36b counted from the innermost are made wider than the other intersecting breaker plies 36, and width edges A and B of the wide breaker plies 36a and 36b are folded outwardly to surround width edges of second and third intersecting breaker plies 36 and width edges of seventh and eighth intersecting breaker plies 36.

As a result, the folded width edges A and B overlap the center portion C of the intersecting breaker plies 36a and 36b of portions of the breaker plies 36a and 36b extending from folded ends 44 and 45 on one side to folded ends 46 and 47 on the other side. Moreover, fourth and ninth intersecting breaker plies 36 are arranged between the width edges A and B of the intersecting breaker ply 36a and between the width edges A and B of the intersecting breaker ply 36b, respectively.

At least one intersecting breaker ply among the folded intersecting breaker plies 36a and 36b, or the intersecting breaker ply 36a in this embodiment is severed at the center portion C on the equatorial plane 26. As a result, all the cords 37 embedded in the center portion C of the intersecting breaker ply 36a are severed at the center D, whose severed ends are free ends without being restrained. In this case, when the tire 21 is rolled under a loaded condition, intersecting breaker plies 36 on the inner side nearer to the carcass layer 22 are subjected to a larger bending deformation to cause larger shearing strains at belt ends. Therefore, in this embodiment, the inner intersecting breaker ply 36a among the folded intersecting breaker plies 36a and 36b is severed at its center portion C.

In the invention, moreover, the intersecting breaker ply 36b arranged on the outer side may be further severed at its center. In this case, it is preferable to severe the breaker ply 36b at a position shifted from the equatorial plane 26. This is because that although an enlargement of diameter is maximum at the equatorial plane 26 of the tire 21 when filled with inner pressure, strength thereat against tensile forces in directions of meridian is lowered.

The function of the tire of the second embodiment will be explained.

In order to form such a tire 21, vulcanizing is required. In vulcanizing, the cords 27, 35 and 37 constructed by heat-shrinkable organic fibers contract several percentages in longitudinal directions by vulcanizing heat so that ply widths of the respective plies, particularly intersecting breaker plies 36 become narrow. In case that the intersecting breaker plies 36 are those whose width edges are folded, intersecting angles of the cords 37 embedded in the proximity of the folded ends 44, 45, 46 and 47 with respect to the equatorial plane 26 become smaller owing to the reduction in ply widths. On the other hand, great shearing forces act on ply ends of the intersecting breaker plies 36a and 36b due to deformations caused by contacting a road. Therefore, great shearing strains will occur in the rubber between the cords 37 of the ply ends (folded ends 44, 45, 46 and 47) by the great shearing forces in conjunction with the reduction in intersecting angles of the cords.

In this embodiment, therefore, the intersecting breaker ply 36a which will undergo larger shearing forces when being deformed in contacting the road is severed at the width center C portion so that lengths of the cords 37 embedded in the center C portion are made shorter than those in the prior art, one half of the length of the prior art, and the cord ends at the severed position D are free ends.

As a result, the ends of the cords 37 in the proximity of the severed position D slide through the rubber, while the ends are contracting during vulcanization so that only the ends of the cords are displaced. Since it is considered that total contracting amount of the cords 37 embedded in the width center C of the intersecting breaker ply 36a is substantially constant, the displacement of the cords 37 positioned at the folded ends 44 and 46 is reduced by the displacement of the ends of the cords 37 in the proximity of the severed position D so that the reduction in ply widths at the center C portion is mitigated. As a result, the narrowing of distances of the cords 37 in the proximity of the folded ends 44 and 46 is restrained so that shearing strains caused in the rubber between the cords 37 positioned at ends (folded ends 44 and 46) of the intersecting breaker ply 36a are reduced, with the result that separations at belt ends are prevented.

Results of testing for the tires according to the second embodiment and tires of the prior art will be explained hereinafter.

In the test, tires of two kinds were prepared. Tires of Example were those explained as the second embodiment and tires of Comparative Example were those similar to those of Example with exception of the radially innermost intersecting breaker ply which was not severed at its width center. The size of these tires was H46×18.0R 20.

These tires were filled with inner pressure of 14.1 kg/cm². Each of these tires was urged under a load of 44,200 Lbs (20,049 kg) against the drum (dynamometer) and driven by the rotating drum at a speed of 40 mile/h (64.37 km/h) over a distance of 35,000 ft (10,668 m). Such a driving of the tire was repeated until the tire was broken or repeated maximum 100 times. As a result, with the tires of Comparative Example, expansions occurred at folded ends of intersecting breaker plies at 65th running. On the other hand, no trouble occurred with tires of Example according to the invention.

Thereafter, these tires were cut and opened to observe cracks at belt layers. Separations occurred at belt ends of the tires of Comparative Example, whereas no cracks occurred at belt ends in the tires of Example according to the invention. According to the invention, separations occurring at folded ends of intersecting belt can be completely prevented to improve the durability of the belt layer of the tire.

Figure 12:
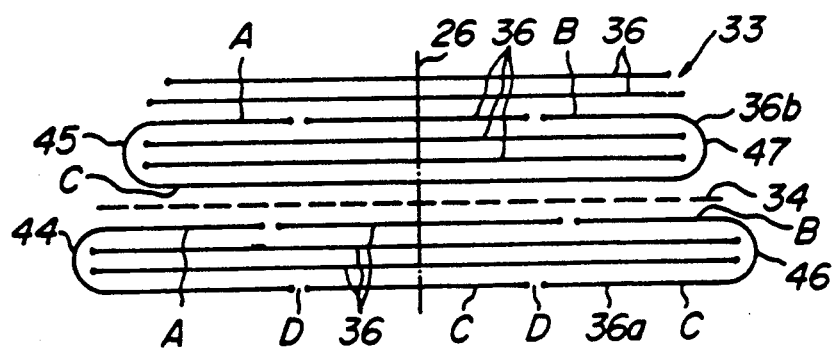
FIG. 12 is a sectional view of belt layers of a third embodiment of the invention taken along a meridian plane.
Figure 13:
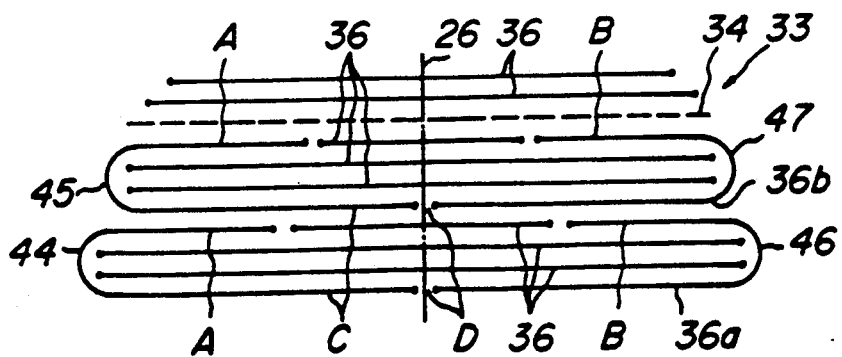
FIG. 13 is a sectional view of belt layers of a fourth embodiment of the invention taken along a meridian plane.

FIGS. 12-13 illustrate other embodiments of the invention wherein intersecting breaker plies are in solid lines and circumferential breaker plies in broken lines.

FIG. 12 illustrates third embodiment of the invention. In this embodiment, an intersecting breaker ply 36a is severed at its center at two locations so that the center portion C extend equal distances from an equatorial plane onto both sides.

FIG. 13 illustrates fourth embodiment of the invention. In this embodiment, an intersecting breaker ply 36b is severed at its center C at an equatorial plane 26 and a circumferential breaker ply 34 is arranged between a tenth intersecting breaker ply 36 counted from the innermost and width edges A and B of an intersecting breaker ply 36b and an eighth intersecting breaker ply 36 or is arranged as a ninth layer counted from the innermost.

In the above embodiments, the width edges A and B of the intersecting breaker plies 36a and 36b are folded in the same directions or radially outwardly. In the present invention, however, the width edges may be folded in different manner. For example, one width edge may be folded radially outwardly and the other width edge may be folded radially inwardly or both the width edges may be folded radially inwardly or radially outwardly.

As can be seen from the above description, according to the invention separations at belt ends can be prevented by mitigating the narrowing of distances between the cords.

FIG. 14 illustrates in section a principal part of a pneumatic radial tire for an aircraft according to the invention. The tire includes a carcass 51, a belt 52, sidewalls 53, round shoulder tread rubbers 54 and an inner liner 55. Reference numeral 56 denotes a contacting tread edge which is an edge of the tread in contact with a road when loaded with a rated load.

The carcass is of course toroidal and consists of turnup plies which are turn up around bead cores (not shown) and include organic fiber codes such as nylon arranged substantially in radial surfaces and a down ply covering the turn-up plies.

The belt 52 is a multiple lamination made of rubber coated cord oblique cloths whose heat-contractible organic fiber cords such as nylon are arranged in parallel with each other. The belt 52 extends over the full width of the tread which contacts the road to surround a crown of the carcass 51. The multiple lamination may consist of two fold structural layers 52a and 52b, a separating layer 52c embraced between the fold structural layers 52a and 52b, and separating layers 52d and 52e arranged on the outside of the fold structural layer 52b. Each of the fold structural layers includes two inner layers and an outer layer wider than the inner layers so as to surround them by its width edges.

The belt 52 contracts in width directions of the tire in vulcanizing for forming the tire so that the belt 52 assumes the position shown in broken lines when the vulcanizing is completed. A thickness of the multi-laminated belt 52 at one edge measured in a radial direction of the tire is indicated by t.

Figure 15A:
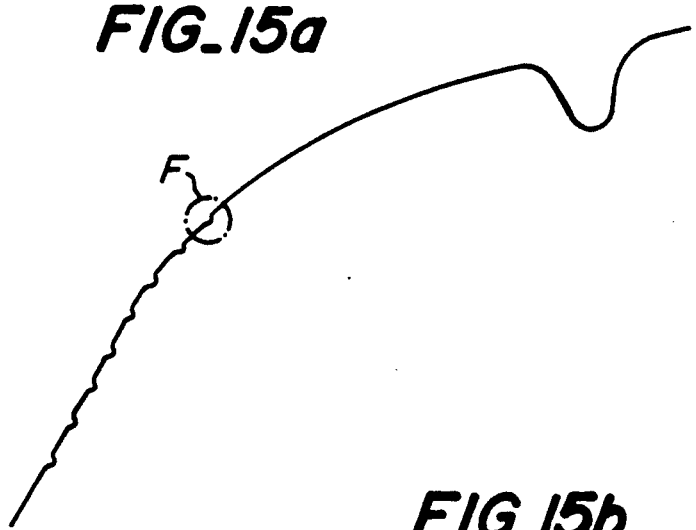
FIGS. 15a and 15b are explanatory views of shallow grooves according to the invention.
Figure 15B:
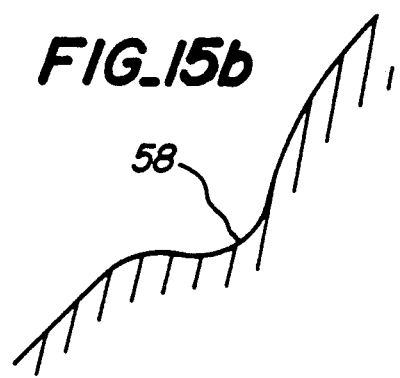

The pneumatic tire above described comprises as illustrated in FIG. 15b a plurality of shallow grooves 58 according to the invention. The grooves 58 are in a buttress area 57 outside each of the contacting tread edges 6 where the round shoulder tread rubber contacts the road when filled with normal inner pressure under a normal load. The grooves 58 have depths of 0.5-1.5 mm and are spaced from each other by 3-10 mm.

The shallow grooves 58 are arranged in a row in an area extending wider than t which is the thickness of the multi-laminated belt 52. In order to avoid sharp edges of the shallow grooves 58, edges of the grooves are chamfered to be rounded. The rounded edges of the shallow groove 58 nearest to the contacting tread edge are preferably smaller in curvature than those of the shallow edges 58 nearer to the sidewall.

By providing the shallow grooves 58 in the buttress areas 57, when the buttress areas contact the road due to side forces acting upon the tire, the friction coefficient $\mu$ between tire surface and the road is lowered to cause slip at the buttress areas 57. The result is that shearing forces acting upon the rubber of the buttress areas 57 are lowered. As a result, there is no risk of cracks occurring in the buttress areas 57.

FIG. 15b is an enlargement of the circle F in FIG. 15a. Depths of the shallow grooves 58 are preferably 0.5-1.5 mm for ensuring the reduction in the friction coefficient. If the depth of the shallow groove 58 is deeper than 1.5 mm, the rubber between the grooves is subjected to large deformations which would result in cracks at bottoms of the grooves 58. On the other hand, if the depth of the grooves 58 is less than 0.5 mm, it does not serve to reduce the friction coefficient. If the edges of the shallow grooves are sharp without being chamfered, the rubber in the proximity of the grooves 58 tends to broken by side forces.

If distances between the grooves 58 are less than 3 mm, there is a tendency of ribs between the grooves to be torn off. Moreover, if the distances are more than 10 mm, cracks tend to occur midway between the shallow grooves 58. Therefore, the distances of the order of 5 mm will bring about a good result.

It is necessary to arrange the shallow grooves 58 in the area including the side areas of the belt 52 axially outwardly of the contacting tread edges 56 when under 100% load.

The edges of the shallow groove 58 are chamfered to be rounded as shown in FIG. 15b. With at least the grooves 58 near to the contacting tread edge 56, curvatures of the edges of the grooves on the side of the sidewall should be larger than those of the edges on the contacting tread edge 56.

EXAMPLE

Tires of H46×18.0R20 and having the rubber thickness in the buttress areas of 10 mm were produced by way of trial. Each of the tires was filled with 200 psi inner pressure and driven under a load of 44,200 Lbs on the drum of the testing machine. During such running, steering angles were increased from 0° to 15° in increments of 1° during which observing whether cracks occurred in the buttress areas.

Figure 16:
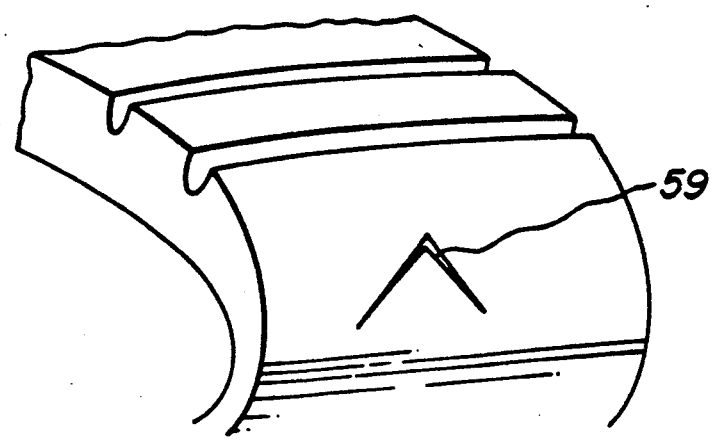
FIG. 16 is an explanatory view for the behavior of occurrence of rubber cracks.

In this test, with tires having no shallow grooves 58 as in the prior art, chevron-shaped cracks 59 occurred at several positions on the circumference of the rubber as schematically shown in FIG. 16.

In contrast herewith, with the tires having shallow grooves 58 according to the invention, no problems occurred until the slip angles arrived at 15°. In this case, the shallow grooves 58 had 1 mm depth and were spaced 5 mm apart from each other and chamfered at edges with radii of curvatures of 6 mm and 1.5 mm on the tread side and the sidewall side, respectively.

For the purpose of comparison, tires of Comparative Example 5 having shallow grooves of 3 mm depth were prepared. With these tires, cracks occurred in bottoms of the grooves at the steering angles of 13°. Without chamfering at edges of the grooves, edges were broken at the steering angles of 12°.

Moreover, tires of Comparative Example 6 having shallow grooves of 1 mm depth and 2.5 mm distances between the grooves were prepared without chamfering at edges of the grooves. Because of too narrow distances between the grooves, ribs between the grooves were broken at the steering angle of 8°.

As can be seen from the above description, the pneumatic radial tire according to the invention can effectively prevent the shevron-shaped cracks in the rubber of rounded shoulders of the tire caused by violent side or lateral forces acting upon wheels of an aircraft landing on a runway, while being subjected to strong lateral wind. Therefore, it can remove the risk that such faults as cracks would develop into a major accident such as a burst, thereby contributing to the safe flying of aircraft.

It is further understood by those skilled in the art that the foregoing description is that of preferred embodiments of the disclosed tires and that various changes and modifications may be made in the invention without departing from the spirit and scope thereof.

What is claimed is:

1. A radial tire for aircraft use comprising; a toroidal carcass layer comprising; at least one carcass ply having cords embedded therein intersecting at angles within a range of 70° to 90° with respect to an equatorial plane of the tire, a tread arranged radially outwardly of the carcass layer, and a belt layer arranged between the carcass layer and the tread, said belt layer constructed by laminating at least one circumferential breaker ply and at least three intersecting breaker plies, said circumferential breaker ply having cords embedded therein substantially in parallel with said equatorial plane, said intersecting breaker plies having cords embedded therein intersecting at angles within a range of 10° to 70° with respect to the equatorial plane, wherein all of said circumferential breaker plies are arranged radially inwardly of a breaker ply positioned from the innermost breaker ply corresponding to a ply number which is obtained by multiplying all of the breaker plies at a center portion of the belt by ¾ and rounding to the nearest positive integer to determine said ply number for positioning said circumferential breaker, both radially outermost and innermost breaker plies of said belt layer are constituted by intersecting breaker plies, and both width edges of said innermost breaker ply are folded radially outwardly and said circumferential breaker ply is arranged radially outwardly of folded width edges of the intersecting breaker ply.

2. A radial tire for an aircraft as set forth in claim 1, wherein both width edges of at least one intersecting breaker ply are folded on a width center portion of an intersecting breaker ply extending from one folded edge to the other folded edge, and at least one folded intersecting breaker ply is cut at its width center portion perpendicularly to a width direction of the breaker ply.

3. A radial tire for an aircraft as set forth in claim 1, wherein said tread is formed with a plurality of shallow grooves having depths of 0.5-1.5 mm and spaced by distances of 3-10 mm from each other, the grooves arranged in a row in an area extending wider than a thickness of edges of said belt measured in a radial direction of the tire in buttress areas outwardly of contact tread edges where round shoulder tread rubbers contact a road when filled with a normal inner pressure under a normal load.

4. A radial tire for an aircraft as set forth in claim 3, wherein said shallow grooves have groove edges chamfered to be rounded.

5. A radial tire for an aircraft as set forth in claim 4, wherein with at least shallow grooves near to said contacting tread edges, curvatures of the edges of the shallow grooves on a side of sidewalls are larger than those of the edges on a side of the contacting tread edges.

* * * * *